(12) United States Patent
Kim et al.

(10) Patent No.: US 10,339,178 B2
(45) Date of Patent: Jul. 2, 2019

(54) FINGERPRINT RECOGNITION METHOD AND APPARATUS

(71) Applicant: Samsung Electronics Co., Ltd., Suwon-si, Gyeonggi-do (KR)

(72) Inventors: Namjoon Kim, Anyang-si (KR); Sungjoo Suh, Seoul (KR); Wonjun Kim, Hwaseong-si (KR); Hyunjeong Lee, Hwaseong-si (KR); Chang Kyu Choi, Seongnam-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 197 days.

(21) Appl. No.: 15/099,994

(22) Filed: Apr. 15, 2016

(65) Prior Publication Data
US 2017/0004346 A1  Jan. 5, 2017

(30) Foreign Application Priority Data

Jun. 30, 2015 (KR) .................. 10-2015-0093370
Jul. 2, 2015 (KR) .................. 10-2015-0094821
Nov. 30, 2015 (KR) .................. 10-2015-0168926

(51) Int. Cl.
*G06K 9/00* (2006.01)
*G06F 16/58* (2019.01)

(52) U.S. Cl.
CPC ..... *G06F 16/5866* (2019.01); *G06K 9/00026* (2013.01); *G06K 9/00926* (2013.01)

(58) Field of Classification Search
CPC ......... G06K 9/00006–9/0012; G06F 17/30268
See application file for complete search history.

(56) References Cited

U.S. PATENT DOCUMENTS

| 5,426,708 A * | 6/1995 | Hamada | G06K 9/00067 356/71 |
| 5,917,928 A * | 6/1999 | Shpuntov | A61B 5/1172 382/124 |
| 6,373,970 B1 | 4/2002 | Dong et al. | |
| 8,401,337 B2 | 3/2013 | Perlmutter et al. | |
| 2002/0030359 A1* | 3/2002 | Bergenek | G06F 21/32 283/68 |
| 2003/0126448 A1* | 7/2003 | Russo | G06K 9/00026 713/186 |
| 2005/0058325 A1* | 3/2005 | Udupa | G06K 9/00087 382/125 |

(Continued)

FOREIGN PATENT DOCUMENTS

| EP | 1646983 B1 | 9/2012 |
| JP | 2006-012031 A | 1/2006 |

(Continued)

OTHER PUBLICATIONS

Zhang et al "Fingerprint Matching Using phase only Correlation and Fourier Mellin Transform" IEEE 2006.*

*Primary Examiner* — Sean T Motsinger
(74) *Attorney, Agent, or Firm* — Harness, Dickey & Pierce, P.L.C.

(57) ABSTRACT

A fingerprint recognition method includes generating an enrollment modified image by modifying a fingerprint image corresponding to a fingerprint to be enrolled; extracting enrollment property information from the fingerprint image; generating mapping information that maps the enrollment modified image to the enrollment property information; and storing the enrollment modified image and the enrollment property information.

18 Claims, 14 Drawing Sheets

(56) References Cited

U.S. PATENT DOCUMENTS

| | | | | |
|---|---|---|---|---|
| 2005/0100199 A1* | 5/2005 | Boshra | G06K 9/001 | |
| | | | 382/124 | |
| 2005/0105783 A1* | 5/2005 | Moon | G06K 9/00087 | |
| | | | 382/124 | |
| 2007/0174633 A1* | 7/2007 | Draper | G06K 9/00073 | |
| | | | 713/186 | |
| 2008/0279416 A1* | 11/2008 | Lo | G06K 9/00087 | |
| | | | 382/100 | |
| 2010/0266168 A1* | 10/2010 | Wang | G06K 9/001 | |
| | | | 382/124 | |
| 2013/0329967 A1* | 12/2013 | Abiko | G06K 9/00026 | |
| | | | 382/115 | |
| 2014/0270420 A1* | 9/2014 | Boshra | G06K 9/0008 | |
| | | | 382/125 | |
| 2016/0180146 A1* | 6/2016 | Setterberg | G06F 3/044 | |
| | | | 382/124 | |
| 2016/0203354 A1* | 7/2016 | Choi | G06K 9/00026 | |
| | | | 382/124 | |
| 2016/0232401 A1* | 8/2016 | Hoyos | G06T 7/11 | |
| 2016/0234430 A1* | 8/2016 | Setterberg | G06K 9/00013 | |
| 2016/0292524 A1* | 10/2016 | Weiss | G07C 9/00158 | |
| 2016/0307023 A1* | 10/2016 | Kim | G06K 9/00087 | |
| 2016/0314337 A1* | 10/2016 | Suh | G06K 9/00013 | |
| 2017/0004295 A1* | 1/2017 | Kim | G06F 17/3028 | |
| 2017/0004346 A1* | 1/2017 | Kim | G06F 17/30268 | |
| 2017/0124328 A1* | 5/2017 | Krishnapura | G06F 21/57 | |
| 2017/0330022 A1* | 11/2017 | Chen | G06K 9/00093 | |

FOREIGN PATENT DOCUMENTS

| | | |
|---|---|---|
| JP | 4188342 B2 | 11/2008 |
| KR | 20100032152 A | 3/2010 |
| KR | 20110057449 A | 6/2011 |
| KR | 101055603 B1 | 8/2011 |

* cited by examiner

FINGERPRINT RECOGNITION METHOD AND APPARATUS

CROSS-REFERENCE TO RELATED APPLICATION

This application claims under 35 U.S.C. § 119 to Korean Patent Application No. 10-2015-0093370 filed on Jun. 30, 2015, Korean Patent Application No. 10-2015-0094821 filed on Jul. 2, 2015, and Korean Patent Application No. 10-2015-0168926 filed on Nov. 30, 2015 in the Korean Intellectual Property Office, the entire contents of each of which are incorporated herein by reference.

BACKGROUND

1. Field

At least one example embodiment relates to a fingerprint recognition method and apparatus.

2. Description of the Related Art

Recently, with developments in various mobile devices such as a smartphone and wearable devices, an importance of a secured authentication is increasing. In biometrics authentication technology, a user may be authenticated based on, for example, a fingerprint, an iris, voice, a face, and a blood vessel. The biometrics authentication technology may use a unique biometric property of each user because the biometric property may be robust against forgery or falsification, not cause an inconvenience for carrying, and change very little over a lifetime.

For example, a fingerprint recognition technique is widely commercialized due to various advantages such as convenience, security, and economical feasibility. The fingerprint recognition technique may enhance a security of user equipment and readily provide various application services such as a mobile payment to users.

In response to downsizing of portable devices, a fingerprint sensing area included in a corresponding device may correspondingly decrease. Accordingly, there is a desire for technology for performing a fingerprint enrollment and a fingerprint recognition using a fingerprint sensor configured to detect a portion of a fingerprint.

SUMMARY

Some example embodiments relate to a fingerprint recognition method.

A fingerprint recognition method may include generating an enrollment modified image by modifying a fingerprint image corresponding to a fingerprint to be enrolled; extracting enrollment property information from the fingerprint image; generating mapping information that maps the enrollment modified image to the enrollment property information; and storing the enrollment modified image and the enrollment property information.

The modifying may include modifying the fingerprint image in at least one of a spatial domain and a frequency.

The extracting may include extracting enrollment phase information from the fingerprint image based on a frequency-domain transform scheme.

The method may further include receiving an input fingerprint image; extracting first property information from a query fingerprint included in the input fingerprint image; generating an input modified image by modifying the input fingerprint image; matching the input modified image and the enrollment modified image based on the extracted first property information and the enrollment property information; and recognizing the query fingerprint based on a result of the matching.

The recognizing may include determining a score indicating a degree to which the input modified image matches the enrollment modified image in an overlapping region of the input modified image and the enrollment modified image.

The determining may include calculating the score based on at least one of a similarity between the input modified image and the enrollment modified image, information associated with the input fingerprint image, and histogram information of the input modified image related, to the enrolment modified image.

The determining may include dividing the overlapping region into sub-regions and calculating, for each of the sub-regions, histogram information of the input modified image relative to the enrollment modified image; and calculating the score based on the histogram information.

The matching may include determining at least one of translation information, rotation information, and scale information of the input modified image and the enrollment modified image, based on the first property information and the enrollment property information.

The extracting may include extracting phase information from the query fingerprint based on a frequency-domain transform scheme, and the matching may include matching the input modified image and the enrollment modified image based on a phase of correlation (POC) between the phase information and enrollment phase information associated with the enrollment fingerprint.

According to at least some example embodiments, a non-transitory computer-readable medium may include program code that, when executed by a processor, performs functions according to the method.

According to at least some example embodiments, a fingerprint recognition apparatus includes a sensor configured to receive a fingerprint image corresponding to a fingerprint to be enrolled; a processor configured to generate an enrollment modified image by modifying the fingerprint image and extract enrollment property information from the fingerprint image; and a memory configured to store the enrollment modified image and the enrollment property information such that the enrollment modified image and the enrollment property information are mapped.

The processor may be configured to generate the enrollment modified image by performing modification in at least one of a spatial domain and a frequency domain.

The processor may be configured to extract enrollment phase information from the fingerprint image based on a frequency-domain transform scheme.

The sensor may be configured to receive an input fingerprint image, and the processor may be configured to extract first property information from a query fingerprint appearing in the input fingerprint image, generate an input modified image by modifying the input fingerprint image, match the input modified image and the enrollment modified image based on the extracted first property information and the enrollment property information, and recognize the query fingerprint based on a result of the matching.

The processor may be configured to determine a score indicating a degree to which the input modified image matches the enrollment modified image in an overlapping region of the input modified image and the enrollment modified image.

The processor may be configured to determine a similarity in the overlapping region between the input modified image and the enrollment modified image.

The processor may be configured to determine the score based on at least one of a similarity between the input modified image and the enrollment modified image, information associated with the input fingerprint image, and histogram information of the input modified image relative to the enrollment modified image.

The processor may be configured to divide the overlapping region into sub-regions, determine, for each of the sub-regions, histogram information of the input modified image relative to the enrollment modified image, and determine the score based on the histogram information.

The processor may be configured to determine at least one of translation information, rotation information, and scale information of the input modified image and the enrollment modified image, based on the first property information and the enrollment property information.

The processor may be configured to extract phase information from the query fingerprint based on a frequency-domain transform scheme, and match the input modified image and the enrollment modified image based on a phase of correlation (POC) between the phase information and enrollment phase information associated with the enrollment fingerprint.

Additional aspects of example embodiments will be set forth in part in the description which follows and, in part, will be apparent from the description, or may be learned by practice of the disclosure.

BRIEF DESCRIPTION OF THE DRAWINGS

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

DETAILED DESCRIPTION

Figure 1:
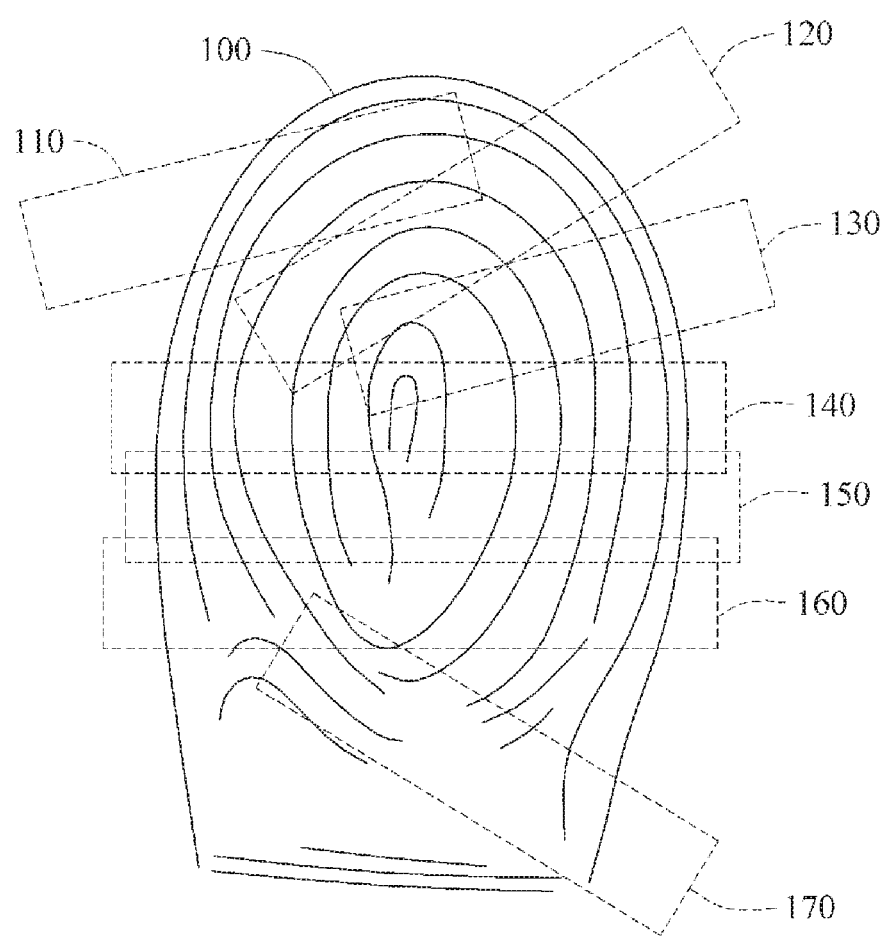
FIGS. 1 and 2 illustrate examples of a fingerprint image according to at least one example embodiment.

Detailed example embodiments of the inventive concepts are disclosed herein. However, specific structural and functional details disclosed herein are merely representative for purposes of describing example embodiments of the inventive concepts. Example embodiments of the inventive concepts may, however, be embodied in many alternate forms and should not be construed as limited to only the embodiments set forth herein.

Accordingly, while example embodiments of the inventive concepts are capable of various modifications and alternative forms, embodiments thereof are shown by way of example in the drawings and will herein be described in detail. It should be understood, however, that there is no intent to limit example embodiments of the inventive concepts to the particular forms disclosed, but to the contrary, example embodiments of the inventive concepts are to cover all modifications, equivalents, and alternatives falling within the scope of example embodiments of the inventive concepts. Like numbers refer to like elements throughout the description, of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the inventive concepts. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the inventive concepts. As used herein, the singular forms "a", "an" and the are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Example embodiments of the inventive concepts are described herein with reference to schematic illustrations of idealized embodiments (and intermediate structures) of the inventive concepts. As such, variations from the shapes of the illustrations as a result, for example, of manufacturing techniques and/or tolerances, are to be expected. Thus, example embodiments of the inventive concepts should not be construed as limited to the particular shapes of regions illustrated herein but are to include deviations in shapes that result, for example, from manufacturing.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and/or in a two-dimensional pattern.

One or more example embodiments may be applied to recognize a fingerprint of a user. Hereinafter, an operation of recognizing the fingerprint may include an operation of verifying or identifying the user by recognizing the fingerprint. An operation of authenticating a user may include an operation of determining whether the user is a pre-enrolled user. In this example, a result of the operation of authenticating may be output to be true or false. The operation of identifying may include an operation of determining a pre-enrolled user corresponding to the user among a plurality of pre-enrolled users. In this example, a result of the operation of identifying may be output as one of identifications (IDs) of the pre-enrolled users. When the pre-enrolled user corresponding to the user is absent, a signal indicating that the user is not identifiable may be output.

One or more example embodiments may be implemented as various forms, for example, a personal computer (PC), a laptop computer, a tablet computer, a television (TV), a smart home appliance, an intelligent vehicle, kiosks, and a wearable device. One or more example embodiments may be applied to authenticate a user in, for example, a smartphone, a mobile device, and a smart home system. One or more example embodiments may be applied to a payment service based on a user authentication. Also, one or more example embodiments may be applied to an intelligent vehicle system for automatically starting an ignition by authentication a user. Hereinafter, one or more example embodiments will be described in detail with reference to the accompanying drawings, wherein like reference numerals refer to like elements throughout.

Figure 2:
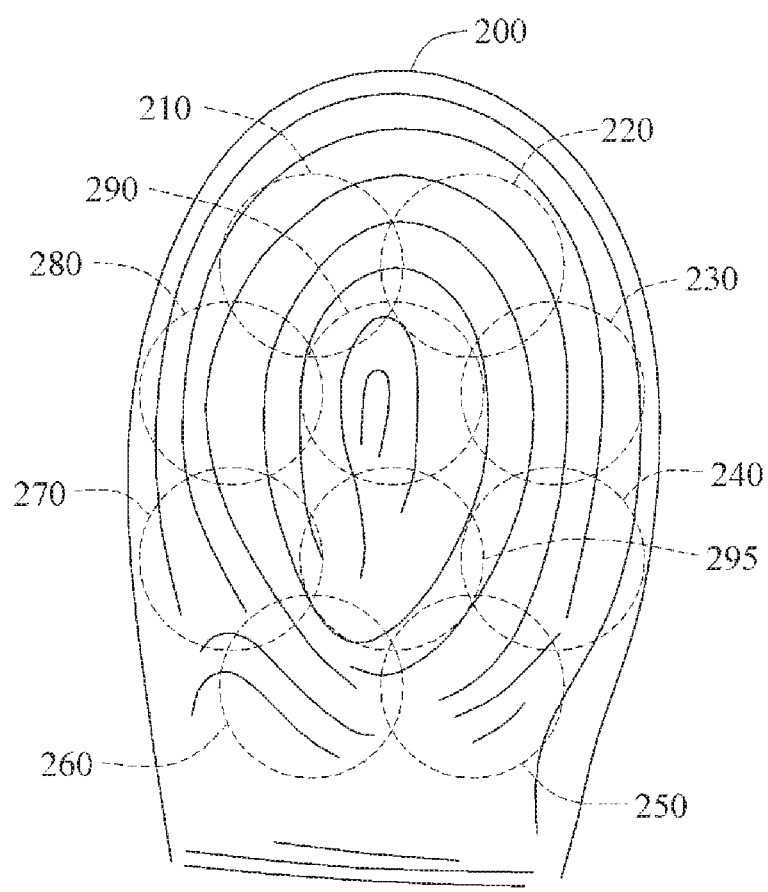

FIGS. 1 and 2 illustrate examples of a fingerprint image according to at least one example embodiment.

Referring to FIG. 1, a fingerprint sensor (not shown) may sense a fingerprint 100 of a user. The fingerprint sensor may sense the fingerprint 100 through a sensing area. In this example, the sensing area of the fingerprint sensor may be smaller than a size of the fingerprint 100. The sensing area of the fingerprint sensor may have a rectangular shape smaller than the size of the fingerprint 100. In this example, the fingerprint sensor may sense a portion of the fingerprint 100 through the sensing area.

The fingerprint sensor may generate a fingerprint image by capturing the fingerprint 100. When the sensing area of the fingerprint sensor is smaller than the size of the fingerprint 100, the fingerprint image generated by the fingerprint sensor may correspond to a partial image including a portion of the fingerprint 100. An image captured by the fingerprint sensor may be, for example, an original image.

The fingerprint image may be used to enroll and recognize the fingerprint 100 of the user. In an example, the fingerprint image may be in a form of an image obtained by modifying the original image captured by the fingerprint sensor, and used to enroll or recognize the fingerprint 100 of the user. Hereinafter, for increased ease and conciseness, the image obtained by modifying the original image may also be referred to as a modified image. The modified image may be, for example, an image obtained by modifying the original image in a spatial domain, an image obtained by modifying the original image in a frequency domain, and an image obtained by modifying the original image in the spatial domain and the frequency domain.

As an example, a modified image of a fingerprint a may be enrolled in an operation of enrollment. The enrolled modified image may be stored in storage (e.g., memory or a pre-installed storage). When a sensing area is smaller than a size of the fingerprint 100, a plurality of modified images corresponding to partial images of the fingerprint 100 of the user may be enrolled. Each of a plurality of partial images, for example, partial images 110 through 170, may be changed to a modified image to be enrolled. Each of the modified images corresponding to the partial images 110 through 170 may cover a portion of the fingerprint 100. Thus, an overall portion of the fingerprint 100 may be covered by the modified images corresponding to the partial images 110 through 170. In this example, the partial images 110 through 170 may overlap. Hereinafter, for increased ease and conciseness of descriptions, the modified image enrolled in the operation of enrollment may also be referred to as, for example, an enrollment modified image.

Also, a fingerprint may be recognized in an operation of recognition. For example, an original image corresponding to the fingerprint input in the operation of recognition may be compared to the enrollment modified image. Hereinafter, for increased ease and conciseness of description, the original image corresponding to the fingerprint input in the operation of recognition may also be referred to as, for example, an input fingerprint image, and an image obtained by modifying the input fingerprint image may also be referred to as, for example, an input modified image. A user verification result or a user identification result may be obtained based on whether the input modified image matches the enrollment modified image. When a size of the sensing area of the fingerprint sensor is smaller than the size of the fingerprint 100, the input modified image may correspond to a portion of the fingerprint 100 of the user. As described with reference to the following examples, the present disclosure provides a method of recognizing a fingerprint by comparing the input modified image and the enrollment modified image.

Although FIG. 1 illustrates that the sensing area of the fingerprint sensor is provided in a rectangular shape as an example, various sizes and shapes are also applicable to the sensing area of the fingerprint sensor. In an example, referring to FIG. 2, the sensing area of the fingerprint sensor may be provided in a circular shape. In this example, in the operation of enrollment, modified images corresponding to a plurality of partial image 210 through 295 may be enrolled based on a single fingerprint, for example, a fingerprint 200. Also, in the operation of recognition, an input modified image corresponding to a portion of the fingerprint 200 may be compared to an enrollment modified image corresponding to each of the partial images 210 through 295.

Depending on an example, a fingerprint sensor used in the operation of enrollment may differ from a fingerprint sensor used in the operation of recognition. As an example, a fingerprint sensor having a rectangular-shaped sensing area as shown in FIG. 1 may be used in the operation of enrollment, and a fingerprint sensor having a circular-shape sensing area as shown in FIG. 2 may be used in the operation of recognition.

Figure 3:
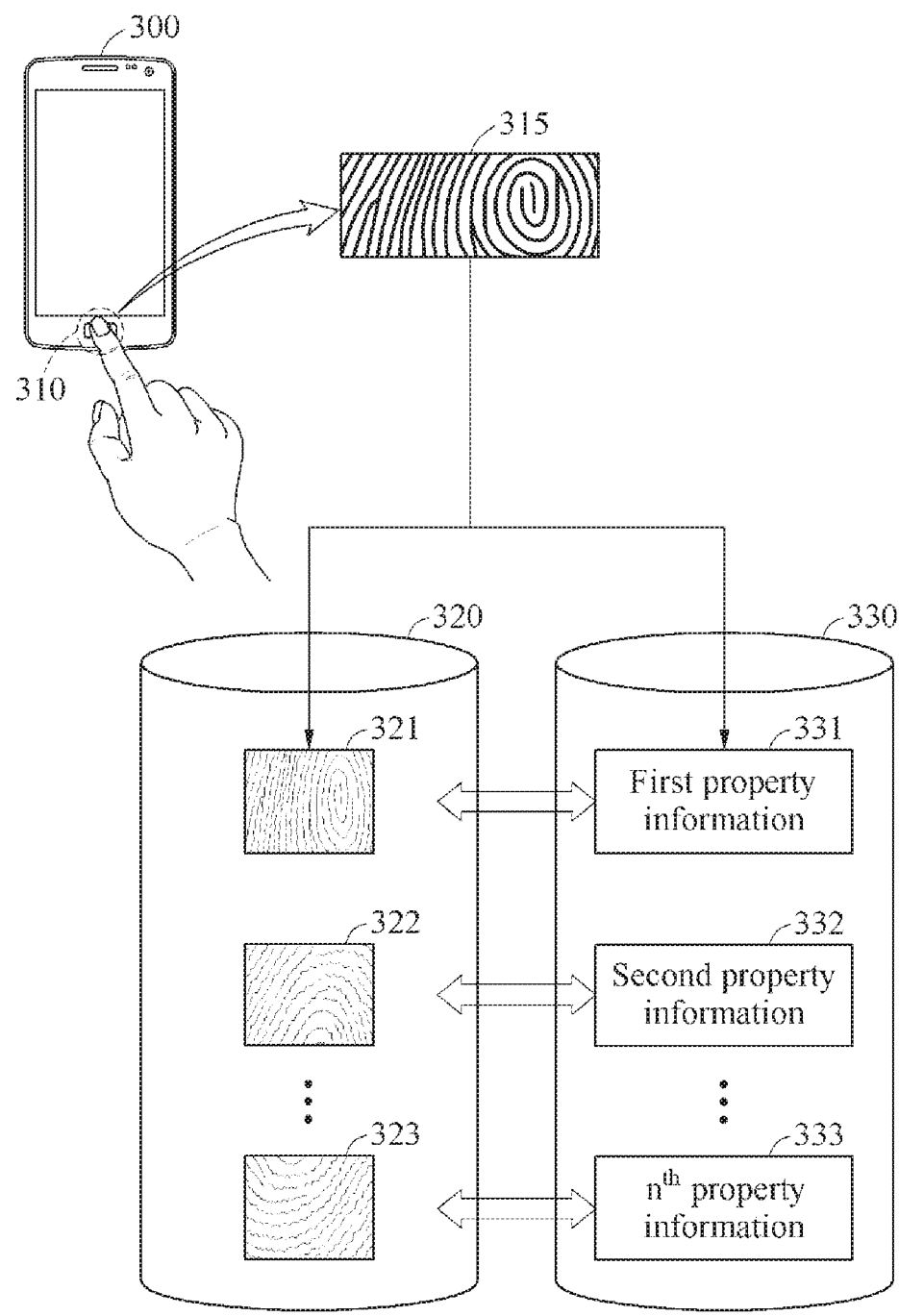
FIG. 3 illustrates an example of data stored based on fingerprint recognition technology according to at least one example embodiment.

FIG. 3 illustrates an example of data stored based on fingerprint recognition technology according to at least one example embodiment.

Figure 13:
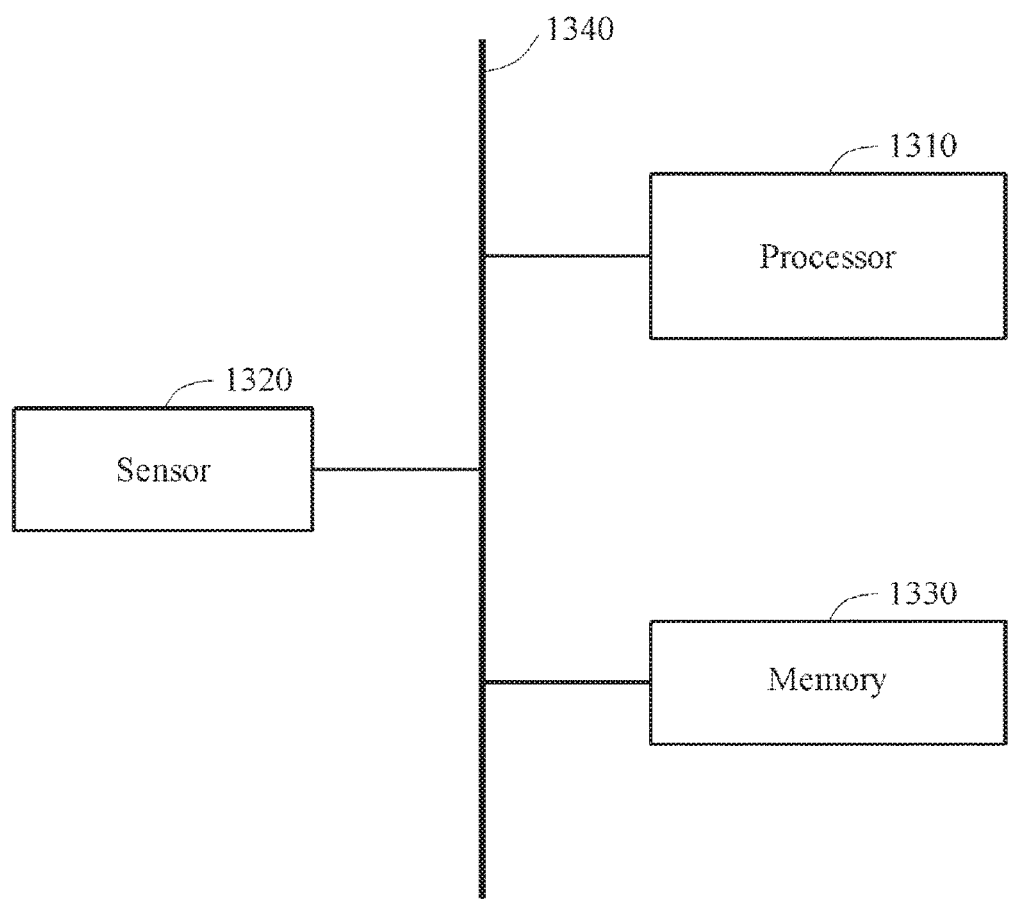
FIG. 13 illustrates an example of a fingerprint recognition apparatus according to at least one example embodiment.

Referring to FIG. 3, a fingerprint recognition apparatus 300 may include a fingerprint sensor 310. A sensing area of the fingerprint sensor 310 may be smaller than a size of a fingerprint of the user. The fingerprint recognition apparatus 300 may acquire an original image 315 using the fingerprint sensor 310. FIG. 13 illustrates an example of the structure of fingerprint recognition apparatus 300.

In an example, to enroll a fingerprint, the fingerprint recognition apparatus 300 may generate an enrollment modified image, for example, a first enrollment modified image 321, by modifying a fingerprint image, for example, an original image 315, corresponding to a fingerprint to be enrolled. Also, the fingerprint recognition apparatus 300 may extract property information corresponding to the fingerprint to be enrolled from a fingerprint image. The fingerprint recognition apparatus 300 may store the first enrollment modified image 321 and the property information corresponding to the fingerprint to be enrolled.

As an example, to enroll the fingerprint, the fingerprint recognition apparatus 300 may record the first enrollment modified image 321 obtained by modifying the original image 351 in an image database 320, and record first property information 331 extracted from the original image 315 in a property database 330. One or both of the image database 320 and the property database 330 may be stored in a memory (not shown) included in the fingerprint recognition apparatus 300. Alternatively, one or both of the image database 320 and the property database 330 may be stored in an external apparatus (not shown), for example, a server to be connected with the fingerprint recognition apparatus 300 wired, wirelessly, or through a network. By incorporating pre-stored property information (e.g., property information stored prior to a matching operation) in the property database 330, time consumption for matching an input modified image and an enrollment modified image may be reduced. Additionally, by extracting the first property information 331 from the original image 315, the fingerprint recognition apparatus 300 reduce a data loss when compared to a case in which the extracting is performed from the input modified image.

Property information may be information indicating, for example, properties of a query fingerprint. In an example, the property information may include information used to determine at least one of scale information, rotation information, and translation information associated with an image corresponding to the query fingerprint and an image corresponding to an enrollment fingerprint. The enrollment fingerprint may be a pre-enrolled fingerprint (e.g., a fingerprint enrolled prior to a matching operation). Descriptions related to the property information will also be provided as an example with reference to FIG. 6.

The image database 320 may not include an original image due to, for example, security concerns. The image database 320 may include an enrollment modified image in lieu of the original image. In this example, the fingerprint recognition apparatus 300 may protect original biometric information including an original fingerprint from being exposed when the image database 320 is breached or damaged due to, for example, hacking. Also, since the property database 330 includes enrollment property information associated with the enrollment modified image for matching the input modified image and the enrollment modified image, the fingerprint recognition apparatus 300 may skip an operation of extracting property information on the enrollment modified image, thereby increasing a speed of fingerprint recognition. In an example, each enrollment modified image of the image database 320 may be mapped to corresponding enrollment property information and stored in the property database 330. For example, as illustrated in FIG. 3, the first enrollment modified image 321 may be mapped to the first property information 331.

Also, to recognize the fingerprint, the fingerprint recognition apparatus 300 may acquire enrollment modified images, for example, the first enrollment modified image 321, a second enrollment modified image 322, and an nth enrollment modified image 323 from the image database 320. According to at least some example embodiments, the image database 320 may be installed in advance. The fingerprint recognition apparatus 300 may also acquire pre-stored property information, for example, first property information 331, second property information 332, and nth property information 333, from the property database 330. The fingerprint recognition apparatus 300 may compare the input fingerprint image to the enrollment modified images to recognize the fingerprint of the user. Hereinafter, for ease and conciseness of descriptions, the pre-stored proper information may also be referred to as, for example, enrollment property information.

In the present disclosure, the descriptions are provided based on an example of the image database 320 including the enrollment modified images. However, at least some example embodiments are not limited thereto. Depending on an example, the image database 320 may include an unmodified original image. In this example, the fingerprint recognition apparatus 300 may compare an unmodified input fingerprint image to an enrolled original image, which is unmodified.

Figure 4A:
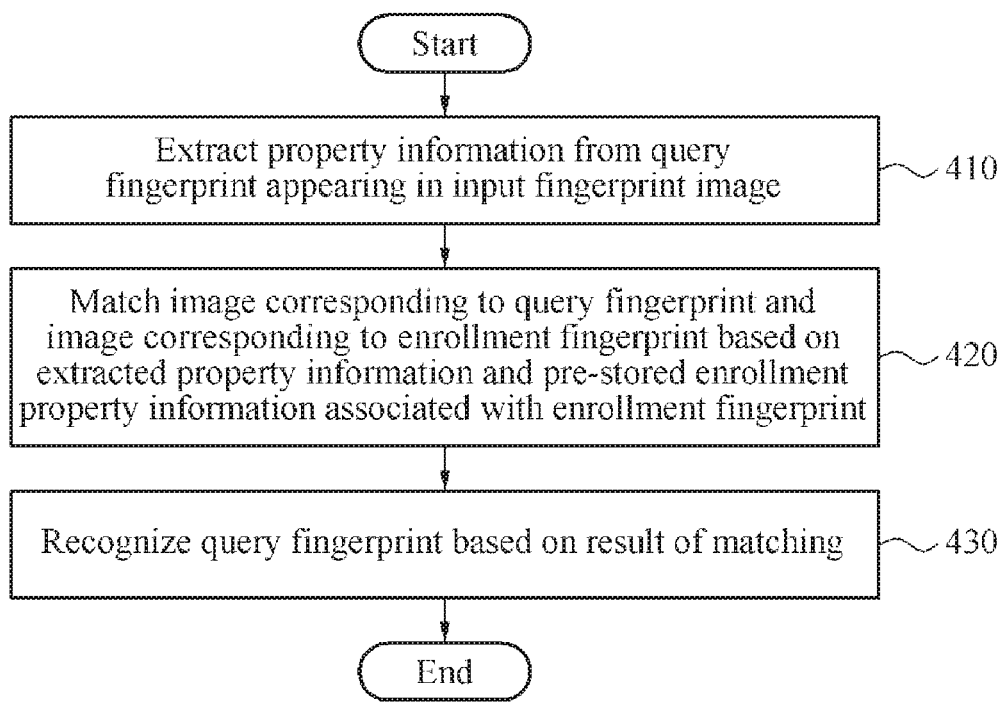
FIGS. 4A through 5 illustrate examples of fingerprint recognition method according to at least one example embodiment.
Figure 4B:
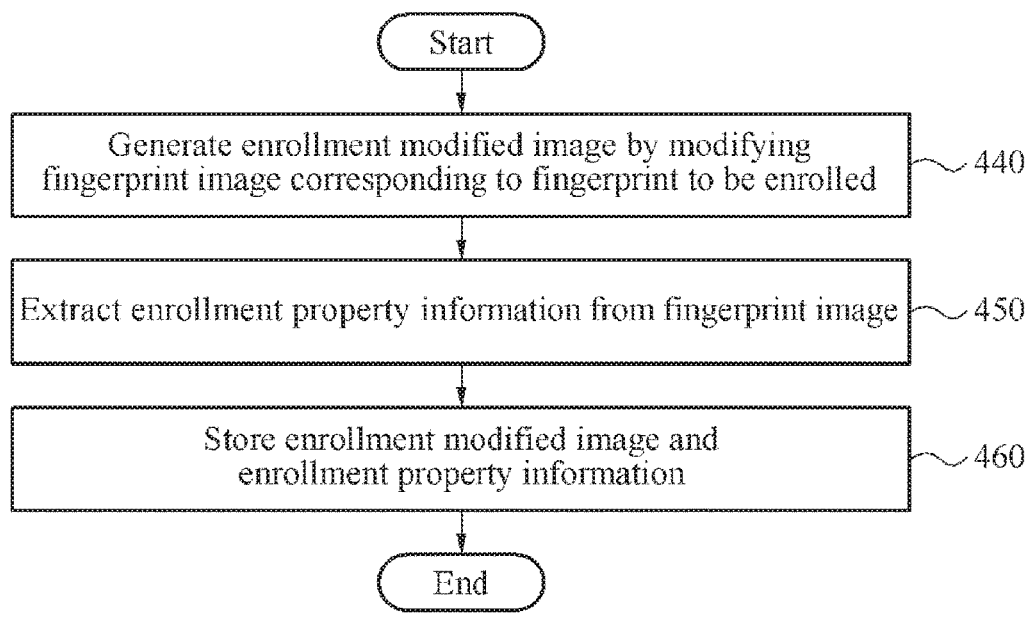
Figure 5:
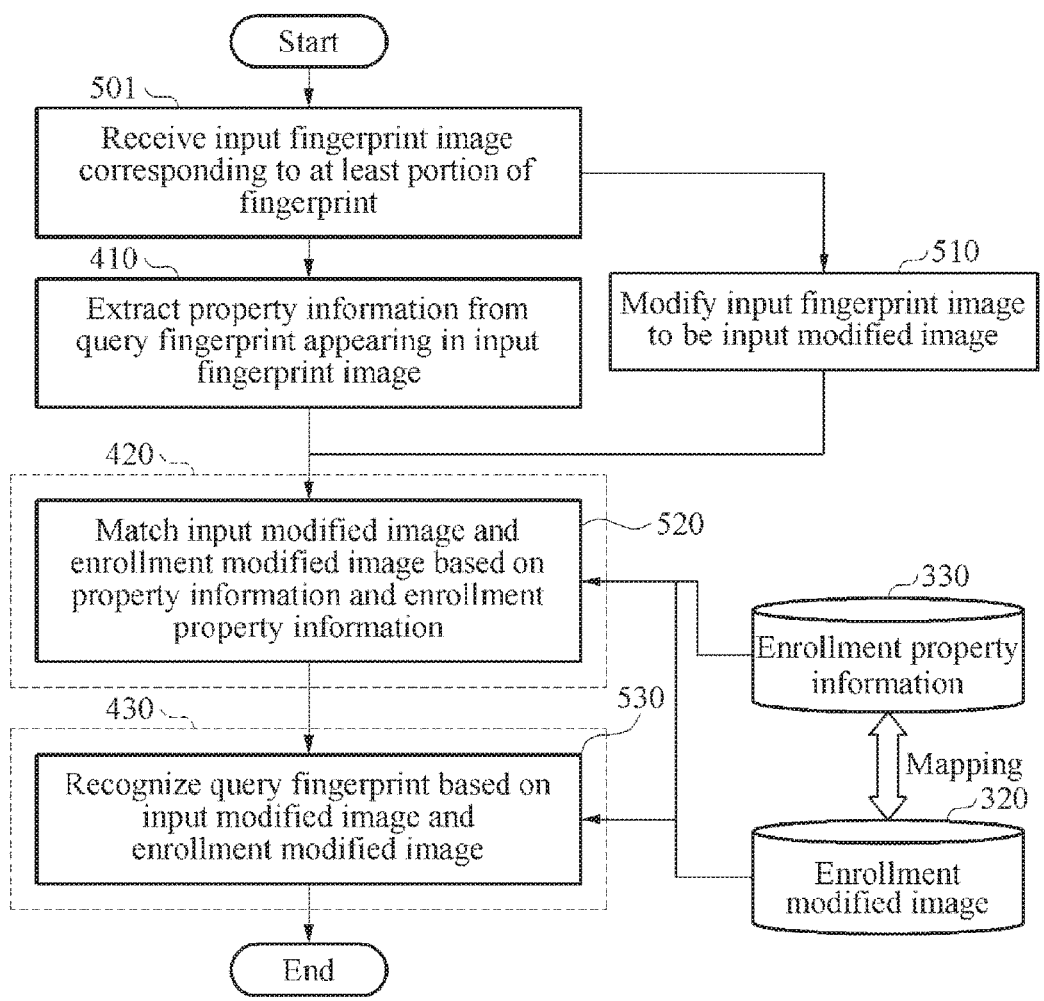

FIGS. 4A through 5 illustrate examples of fingerprint recognition method according to at least one example embodiment.

FIG. 4A is a flowchart illustrating an example of a fingerprint recognition method.

In operation 410, a processor (e.g., the processor 1310 discussed in greater detail below with reference to FIG. 13) of a fingerprint recognition apparatus may extract property information from a query fingerprint appearing in an input fingerprint image. The query fingerprint may be, for example, a fingerprint to be recognized and may indicate a fingerprint appearing in an input fingerprint image obtained by capturing at least a portion of the fingerprint.

In operation 420, the processor may match an image corresponding to the query fingerprint and an image corresponding to an enrollment fingerprint based on the extracted property information and pre-stored enrollment property information associated with the enrollment fingerprint. The processor may acquire enrollment property information from the property database 330 of FIG. 3. The image corresponding to the query fingerprint may be, for example, an input modified image. Also, the image corresponding to the enrollment fingerprint may be, for example, an enrollment modified image.

In operation 430, the processor may recognize the query fingerprint based on a result of the matching. As an example, the processor may calculate a similarity indicating a degree of similarity between two images in an overlapping region of the two images based on the result of the matching the image corresponding to the query fingerprint and the image corresponding to the enrollment fingerprint, and may recognize the query fingerprint based on the similarity. In this example, the processor may identify a fingerprint corresponding to the query fingerprint from enrollment fingerprints or verify whether the query fingerprint is a fingerprint enrolled in advance.

In the present disclosure, the similarity may indicate a degree to which the input modified image is similar to a predetermined or, alternatively, desired enrollment modified image in a region in which the input modified image overlaps the enrollment modified image based on a matching result.

FIG. 4B is a flowchart illustrating an example of a fingerprint enrollment process for performing a fingerprint recognition method.

In operation 440, a processor (e.g., the processor 1310 discussed in greater detail below with reference to FIG. 13) of a fingerprint recognition apparatus may generate an enrollment modified image by modifying a fingerprint image corresponding to a fingerprint to be enrolled. For example, the processor may generate the enrollment modified image by modifying the fingerprint image in at least one of a spatial domain and a frequency domain.

In operation 450, the processor may extract enrollment property information from the fingerprint image. For example, the processor may extract enrollment phase information from the fingerprint image based on a frequency-domain transform scheme. For example, the frequency-domain transform may include Fast Fourier Transform (FFT).

In operation 460, a memory (e.g., the memory 1330 discussed in greater detail below with reference to FIG. 13) of the fingerprint recognition apparatus may store the enrollment modified image and the enrollment property information. According to at least some example embodiments, the processor may control the memory to store the enrollment modified image and the enrollment property information in such a manner that the enrollment modified image is mapped to the enrollment property information. In an example, the processor may control the memory in such a manner that the enrollment modified image is mapped to the enrollment property information, for example, the enrollment phase information, and control the memory to store a result of the mapping so as to enroll the fingerprint. For example, the processor can perform the above-referenced mapping by generating one or more mapping tables and storing the one or more mapping tables in the memory.

In an example, the enrollment modified image and the enrollment property information stored in operation 460 may be used by the processor recognizing the fingerprint as illustrated in FIG. 4A.

FIG. 5 is a flowchart illustrating another example of a fingerprint recognition method.

Since the descriptions provided with reference to operation 410 of FIG. 4A are also applicable here, repeated descriptions will be omitted for brevity. Operations 420 and 430 of FIG. 4A will also be described with reference to operations 520 and 530 of FIG. 5.

In operation 501, a sensor (e.g., the sensor 1320 discussed in greater detail below with reference to FIG. 13) of a fingerprint recognition apparatus may receive an input fingerprint image corresponding to at least a portion of a fingerprint. Also, the sensor may generate the input fingerprint image by capturing at least a portion of the fingerprint.

In operation 510, a processor (e.g., the processor 1310 discussed in greater detail below with reference to FIG. 13) of the fingerprint recognition apparatus may modify the input fingerprint image to be an input modified image. The processor may modify the input fingerprint image to an input modified image corresponding to a query fingerprint. The input modified image may be an image obtained by modifying the input fingerprint image by converting a type of the input fingerprint image to for example, a local binary pattern (LBP) type, a histogram of oriented gradients (HOG) type, a Haar feature type, a modified census transform (MCT) type, an N-bit quantized type, N being an integer greater than or equal to 1, and a geometrically warped type. However, according to at least some example embodiments, a type of the input modified image is not limited thereto.

In operation 520, the processor may match the input modified image and an enrollment modified image based on property information and enrollment property information. The processor may acquire the enrollment property information from the property database 330 of FIG. 3 and acquire the enrollment modified image from the image database 320 of FIG. 3. The processor may cause the memory to store and map the enrollment property information and the enrollment modified image, and control the memory to store a result of the mapping.

For example, the processor may perform the matching based on the property information and the enrollment property information. In an example, the fingerprint recognition apparatus may perform the matching based on property information extracted from an unmodified input fingerprint image and enrollment property information extracted from the unmodified original fingerprint image and stored in advance. Since the fingerprint recognition apparatus uses enrollment property information extracted from an unmodified original image, the matching may be more accurately performed when compared to a case in which the fingerprint recognition apparatus uses property information of a modified image.

Also, the processor may calculate a similarity based on the input modified image and the enrollment modified image. To calculate the similarity, the input modified image may be the same type as that of the enrollment modified image. As an example, when the enrollment modified image is an N-bit quantized type image, the processor may modify the input fingerprint image to have the N-bit quantized type, thereby matching image types of the input modified fingerprint image and the enrollment modified image.

In operation 530, the processor may recognize the query fingerprint based on the input modified image and the enrollment modified image. In an example, the processor may recognize the query fingerprint by comparing the input modified image to the enrollment modified image. For example, the processor may compare the input modified image to the enrollment modified image in a region in which the input modified image overlaps the enrollment modified image based on a result of the matching the input modified image and the enrollment modified image.

The processor may calculate a similarity in an overlapping region between the input modified image and the enrollment modified image. The processor may calculate a similarity between the input modified image and the enrollment modified image as shown in Equation 1. Equation 1 represents a normalized cross correlation (NCC).

$$R = \frac{\sum_{x',y'} (E(x', y') \cdot I(x', y'))}{\sqrt{\sum_{x',y'} E(x', y')^2 \cdot \sum_{x',y'} I(x', y')^2}}$$ [Equation 1]

In Equation 1, x' and y' denote coordinates of the region in which the input modified image overlaps the enrollment modified image based on a result of the matching. E(x',y') denotes a pixel value (e.g., pixel brightness value) of the enrollment modified image at the coordinates (x',y') in the overlapping region. I(x',y') denotes a pixel value (e.g., pixel brightness value) of the input modified image at the coordinates (x',y') in the overlapping region. R denotes an NCC value of pixels overlapping between the input modified image and the enrollment modified image. A value of R may increase according to an increase in a similarity of the pixels between the input modified image and the enrollment modified image. A scheme of calculating the similarity is not limited to an example of Equation 1 and thus, various schemes may be used to calculate the similarity. Related descriptions will also be provided as an example with reference to FIG. 9.

Figure 6:
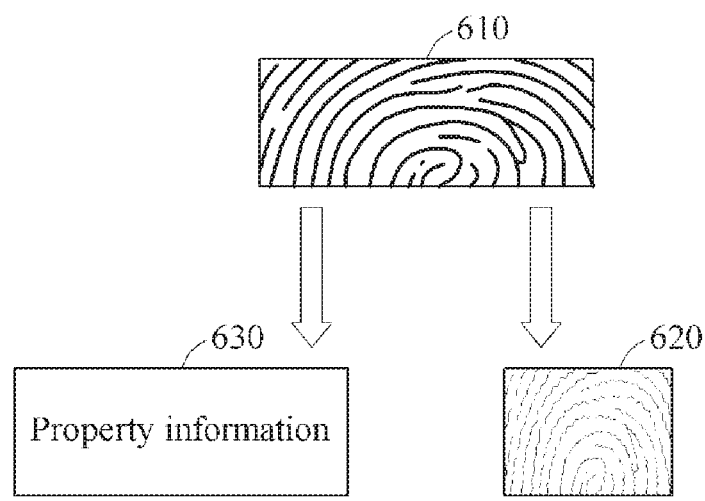
FIG. 6 illustrates an example of an input modified image and property information extracted from an input fingerprint image according to at least one example embodiment.

FIG. 6 illustrates an example of an input modified image and property information extracted from an input fingerprint image according to at least one example embodiment.

A fingerprint recognition apparatus may extract property information 630 from an input fingerprint image 610. The property information 630 may indicate information indicating properties of the input fingerprint image 610. The property information 630 may include, for example, one or more of scale-invariant feature transform (SIFT) information, minutiae information, and phase information extracted from a query fingerprint based on a frequency-domain transform scheme. A type of information included in the property information 630 is not limited to the above-referenced examples. The phase information may indicate information on a phase of the input fingerprint image 610 on which a conversion into a frequency domain is performed. The phase information enrolled in advance may also be referred to as, for example, enrollment phase information.

Also, the fingerprint recognition apparatus may modify the input fingerprint image 610 to an input modified image 620. The input modified image 620 may be a different type from a type of the input fingerprint image 610. The input modified image 620 may have, for example, an LBP type, a HOG type, a Haar feature type, an MCT type, and an N-bit quantized type. However, a type of the input modified image 620 is not limited thereto.

Figure 7:
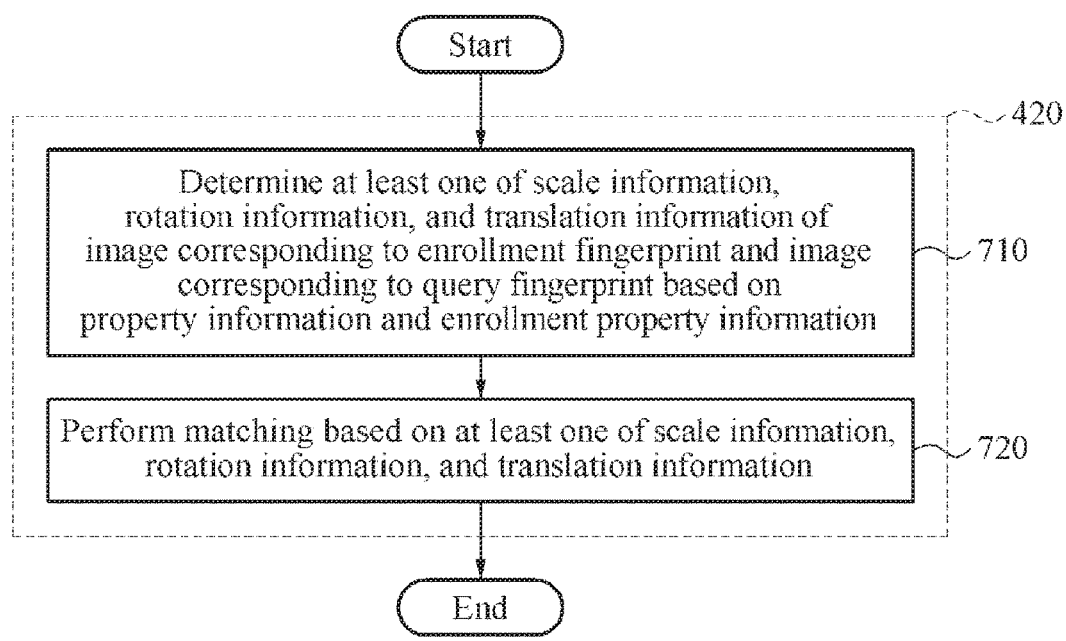
FIG. 7 illustrates an example of an image matching procedure according to at least one example embodiment.
Figure 8:
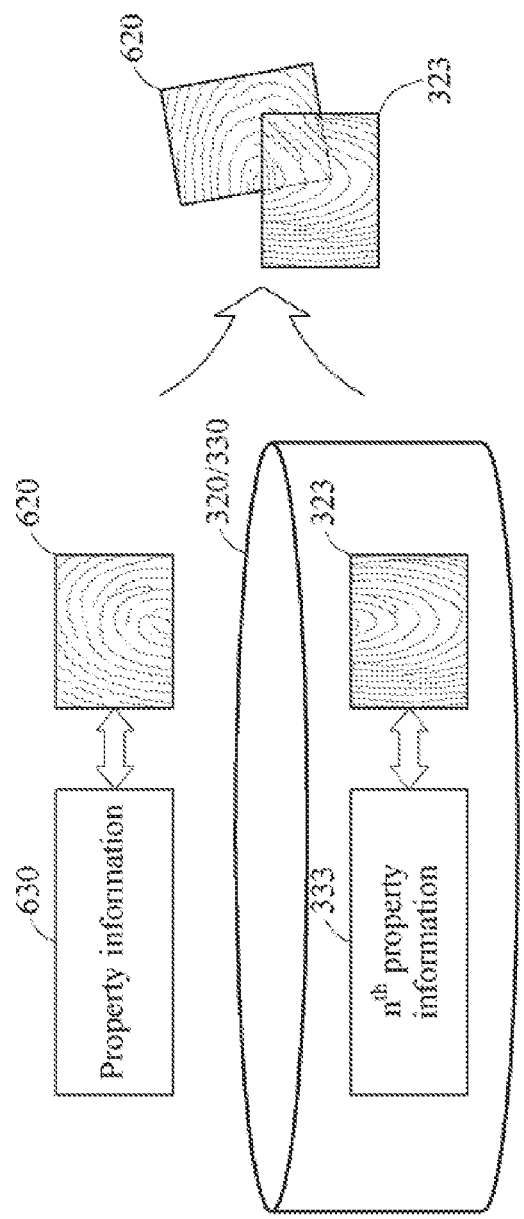
FIG. 8 illustrates an example of matching an input modified image and an enrollment modified image according to at least one example embodiment.

FIG. 7 illustrates an example of an image matching procedure according to at least one example embodiment. FIG. 8 illustrates an example of matching an input modified image and an enrollment modified image according to at least one example embodiment.

A matching process of operation 420 in FIG. 4A will also be described with reference to operations 710 and 720 of FIG. 7.

In an example, an image matching may be a processing scheme for modifying differing images to be represented in one coordinate system. The image matching may be performed to acknowledge a corresponding relationship of images acquired using different measurement schemes. The image matching may be performed using, for example, at least one of a spatial domain-based matching scheme and a frequency domain-based matching scheme.

In the spatial domain-based matching scheme, pixel intensity patterns or features in images may be matched to each other in an image domain. When the number of feature point pairs included in the images is greater than the minimum number of feature point pairs used to modify a corresponding image, image modification of the images may be searched based on a known scheme, for example, a random sample consensus (RANSAC).

In the frequency domain-based matching scheme, a parameter for the image modification of the images may be detected from the frequency domain. In this example, a detectable parameter for the image modification may be, for example, image translation, a rotation angle, and a change in scale. When a third image is generated by computing a phase correlation coefficient between the images in a Fourier space, a portion indicating a maximum value in the third image may be a relative translation vector between the images. Hereinafter, although the descriptions are provided based on an example of the frequency domain-based matching scheme, the disclosure is not limited thereto.

In operation 710, a processor (e.g., the processor 1310 discussed in greater detail below with reference to FIG. 13) of a fingerprint recognition apparatus may determine at least one of scale information, rotation information, and translation information of an image corresponding to an enrollment fingerprint and an image corresponding to a query fingerprint based on the property information 630 and enrollment property information, for example, the nth property information 333, as illustrated in FIG. 8. Hereinafter, descriptions will be provided based on an example in which the image corresponding to the query fingerprint is the input modified image 620 and the image corresponding to the enrollment fingerprint is the enrollment modified image 323. In an example, the processor may determine scale information, rotation information, and translation information of the input modified image 620 and the enrollment modified image 323, and various combinations thereof based on the frequency-domain transform scheme. A frequency-based matching scheme may be, for example, a scheme for performing matching in a frequency domain.

Translation information of the input modified image 620 and a predetermined or, alternatively, desired enrollment modified image, for example, the enrollment modified image 323, may include an x-axial translation parameter, Tx, and a y-axial translation parameter, Ty. The rotation information of the input modified image 620 and the enrollment modified image 323 may include a rotation parameter, R. The scale information may include a scale parameter, S. Hereinafter, Tx and Ty may also be referred to as a translation amount and R may also be referred to as a rotation angle. The fingerprint recognition apparatus may calculate the rotation angle and the translation amount by comparing the input modified image 620 and the enrollment modified image 323 in the frequency domain. As an example, in FIG. 8, the fingerprint recognition apparatus may use the property information 630 and the nth property information 333 to determine the scale information, the rotation information, and the translation information of the input modified image 620 and the enrollment modified image 323.

Also, the fingerprint recognition apparatus may determine a phase of correlation (POC) between phase information included in the property information 630 and enrollment phase information included in the nth property information 333. Based on the POC, the fingerprint recognition apparatus may determine the scale information, the rotation information, and the translation information of the input modified image 620 and the enrollment modified image 323, and various combinations thereof.

In operation 720, the processor may perform matching based on at least one of the scale information, the rotation information, and the translation information. To compare the input modified image 620 and the enrollment modified image 323, the fingerprint recognition apparatus may match the input modified image 620 and the enrollment modified image 323. As an example, the fingerprint recognition apparatus may apply any or all of scaling, rotation, and/or translation to the input modified image 620 such that regions commonly included in the input modified image 620 and the enrollment modified image 323 overlaps each other. As another example, the fingerprint recognition apparatus may apply any or all of scaling, rotation, and/or translation to the enrollment modified image 323. Since the input modified image 620 and the enrollment modified image 323 correspond to partial images, the overlapping region may be smaller in size than each of the input modified image 620 and the enrollment modified image 323.

The fingerprint recognition apparatus may translate the input modified image 620 based on translation information obtained as a result of the matching. The fingerprint recognition apparatus may rotate the input modified image 620 based on rotation information obtained as the result of the matching. The fingerprint recognition apparatus may upscale or downscale the input modified image 620 based on scale information obtained as the result of the matching. Since the translation information, the rotation information, and the scale information are relative between the input modified image 620 and the enrollment modified image 323, the fingerprint recognition apparatus may perform translation, rotation, and scaling on the enrollment modified image 323 in lieu of the input modified image 620.

FIG. 8 illustrates an example of the input modified image 620 translated and rotated by a fingerprint recognition apparatus relative to the enrollment modified image 323.

In an example, to increase accuracy, the fingerprint recognition apparatus may extract property information from an original image in lieu of a modified image. Since enrollment property information is previously stored in the fingerprint recognition apparatus, the fingerprint recognition apparatus may skip a process of extracting the enrollment property information and perform matching with an increased speed.

When the input modified image 620 overlaps the enrollment modified image 323 due to the translation, rotation, and scaling, the fingerprint recognition apparatus may calculate a matching score in an overlapping region. For example, the fingerprint recognition apparatus may calculate a matching score in consideration of a normalized correlation based on an image brightness value. In one or more example embodiments, a fingerprint may be accurately recognized in response to an input fingerprint image input at a predetermined or, alternatively, desired angle. Descriptions related to a score calculation will be provided as an example with reference to FIG. 9.

Figure 9:
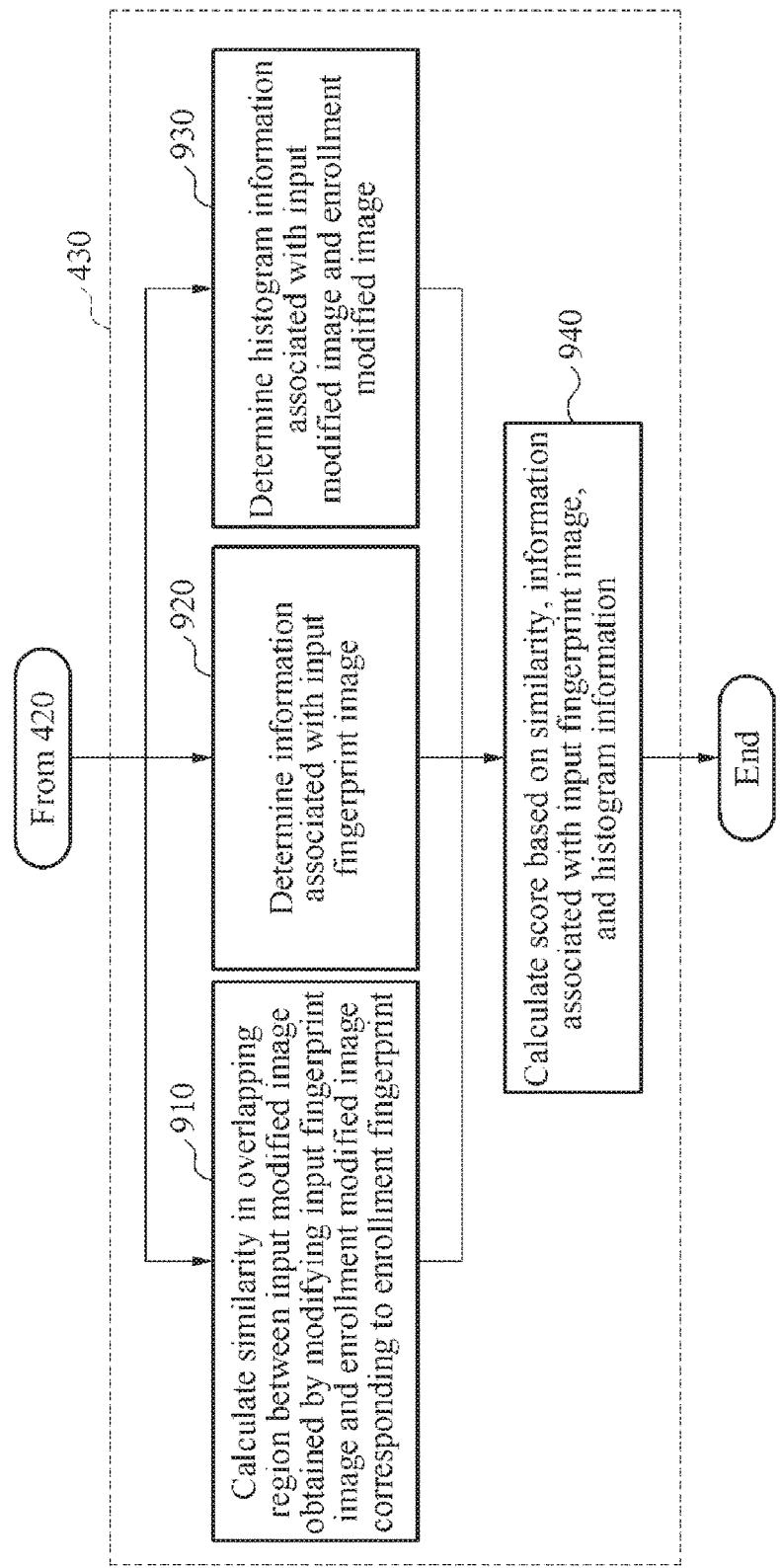
FIG. 9 illustrates an example of calculating a score for fingerprint recognition according to at least one example embodiment.

FIG. 9 illustrates an example of a score calculation for fingerprint recognition according to at least one example embodiment.

A fingerprint recognition apparatus may calculate a score indicating a degree to which an image corresponding to a query fingerprint matches an image corresponding to an enrollment fingerprint, in an overlapping region of the images to recognize a fingerprint in operation 430 of FIG. 4A. Descriptions related to the score calculation performed for the fingerprint recognition in operation 430 of FIG. 4A will be provided through operations 910 through 940 of FIG. 9 as an example.

In operation 910, in operation 910, a processor (e.g., the processor 1310 discussed in greater detail below with reference to FIG. 13) of the fingerprint recognition apparatus may calculate a similarity in an overlapping region between an input modified image obtained by modifying an input fingerprint image and an enrollment modified image corresponding to an enrollment fingerprint.

As an example, when the input modified image and the enrollment modified image are a 1-bit quantized type image, for example, a binary-coded image, the similarity may be calculated as follows. The fingerprint recognition apparatus may convert a full-bit input fingerprint image to be a 1-bit input modified image in the aforementioned operation 510. The fingerprint recognition apparatus may calculate a similarity with respect to an overlapping region between the binary-coded input modified image and the enrollment modified image as shown in Equation 2.

$$M_{bin} = \frac{\sum_{x,y}(E_{bin}(x, y) \& Q_{bin}(x, y))}{M_{Area}} \qquad \text{[Equation 2]}$$

In Equation 2, $M_{bin}$ denotes a similarity between the input modified image and the enrollment modified image. The expression $E_{bin}(x, y)$ denotes a binary value of the enrollment modified image at coordinates (x, y) in the overlapping region. The expression $Q_{bin}(x, y)$ denotes a binary value of the input modified image at the coordinates (x, y) in the overlapping region. The operator & denotes a bitwise AND operator. The expression $M_{area}$ denotes a number of pixels in the overlapping region generated as a matching result of the input modified image and the enrollment modified image. The expression (x, y) denotes coordinates in the overlapping region. A value of $M_{bin}$ may increase according to an increase in the similarity between the input modified image and the enrollment modified image.

In operation 920, the processor may determine information associated with the input fingerprint image. As an example, the processor may use information on the input fingerprint image, for example, an original image, thereby improving accuracy. The fingerprint recognition apparatus may determine the information associated with the input fingerprint image based on Equation 3.

$$M_{Ratio} = \frac{\text{norm}(qSum_{E1})}{\text{norm}(qSum_{E0})} \qquad \text{[Equation 3]}$$

In Equation 3, the expression $\text{norm}(qSum_{E1})$ indicates a normalized value of a sum of pixel values (e.g., pixel brightness values) of the input fingerprint image (which may be, for example, an unmodified image) corresponding to pixels of the input modified image (which may be, for example, the binary-coded image) having a value of 1 in the overlapping region between the input modified image and the enrollment modified image. Also, the expression $\text{norm}(qSum_{E0})$ indicates a value obtained by normalizing a sum of values of pixels in the input fingerprint image corresponding to pixels in an input modified image having a value of 0 in the overlapping region. The greater the value of norm(q $Sum_{E1}$), the smaller a difference between a maximum value (e.g., maximum pixel brightness value) of an original input fingerprint image and a pixel value (e.g., pixel brightness value) converted to 1 of the binary-coded image. Thus, an amount of data loss may be relatively small. The smaller the value of norm(q $Sum_{E0}$), the smaller a difference between a minimum value (e.g., a minimum pixel brightness value) of the original input fingerprint image and a pixel value (e.g., pixel brightness value) converted to 0 of the binary-coded image. Thus, an amount of data loss may also be relatively small. When a value of $M_{Ratio}$ increases, the amount of data loss may decrease. Thus, the similarity between the input modified image and the enrollment modified image may be verified to be more accurate.

As an example, when the input fingerprint image is an 8-bit image, and when the input modified image is a 1-bit binary-coded image, an amount of image information may be reduced by ⅛ and thus, a recognizability of the input modified image may also decrease. To solve the aforementioned issue, the fingerprint recognition apparatus may identify information associated with the input fingerprint image and apply the information to a fingerprint recognition.

In operation 930, the processor may determine histogram information associated with the input modified image and the enrollment modified image. For example, the processor may divide the overlapping region into sub-regions, and calculate histogram information related to an image corresponding to an enrollment fingerprint and an image corresponding to the query fingerprint. Descriptions related to an example of calculating the histogram information for the sub-regions will be provided with reference to FIG. 12.

In an example, the processor may calculate, with respect to pixels of a sub-region, a normalized value of differences between pixel values of a plurality of pixels of the enrollment modified image and pixel values of a plurality of pixels of the input modified image. For example, the processor may normalize the differences by dividing each value of differences into a maximum value of differences such that the normalized maximum value of difference is 1 and the normalized minimum value of difference is 0. The processor may calculate, as histogram information, a difference between a maximum value and a minimum value of normalized pixel difference values of all sub-regions. For example, the processor may calculate a plurality of difference values for a sub-region by performing a difference determination operation that includes calculating, for each pixel of a plurality of pixels of the enrollment modified image that are located in the sub-region, a difference between (i) a brightness value of the pixel of the enrollment modified image and (ii) a brightness value of a corresponding pixel in the input modified image, where pixels of the enrollment modified image correspond to pixels of the input modified image that are located in the same spatial location as the pixels of the enrollment modified image, respectively. Further, the processor may perform a histogram information determination operation that includes determining, from among the plurality of difference values calculated for the sub region by the difference determination operation, a first difference value (e.g. the minimum difference value from among the plurality of difference values calculated for the sub region) and a second pixel value (e.g., the maximum difference value from among the plurality of difference values calculated for the sub region), and calculating, as histogram information for the sub-region, a difference between the determined first difference value and the determined second difference value. The processor may perform the above-referenced difference determination and histogram information determination operations for each sub-region. Hereinafter, the difference between the first difference value and the second difference value calculated for a sub-region may also be referred to as, for example, Hmax–min. Also, the processor may calculate a value, for example, Hdistr, representing a pixel difference value distribution with respect to the pixel difference values calculated for each sub-region as the histogram information. However, an example of the histogram information is not limited thereto.

In operation 940, the processor may calculate a score based on the similarity, information associated with the input fingerprint image, and the histogram information. For example, the processor may calculate the score as shown in Equation 4.

$$M_{Score}=P(M_{bin} \times M_{Ratio}, H_{max-min}, H_{distr}) \quad \text{[Equation 4]}$$

In Equation 4, $M_{bin}$ may be calculated based on Equation 2 and $M_{Ratio}$ may be calculated based on Equation 3. $H_{max-min}$ and $H_{distr}$ indicates items of histogram information determined in operation 930. $M_{score}$ is a finally determined score indicating a degree to which the input modified image matches the enrollment modified image, and may be expressed as a probability. The greater a value of the store $M_{score}$, the higher the probability that the input modified image is the same as the enrollment modified image. As an example, when the value of the score $M_{score}$ exceeds a threshold, the processor may recognize that an input fingerprint corresponding to the input modified image is the same as an image corresponding to the enrollment modified image.

Figure 10:
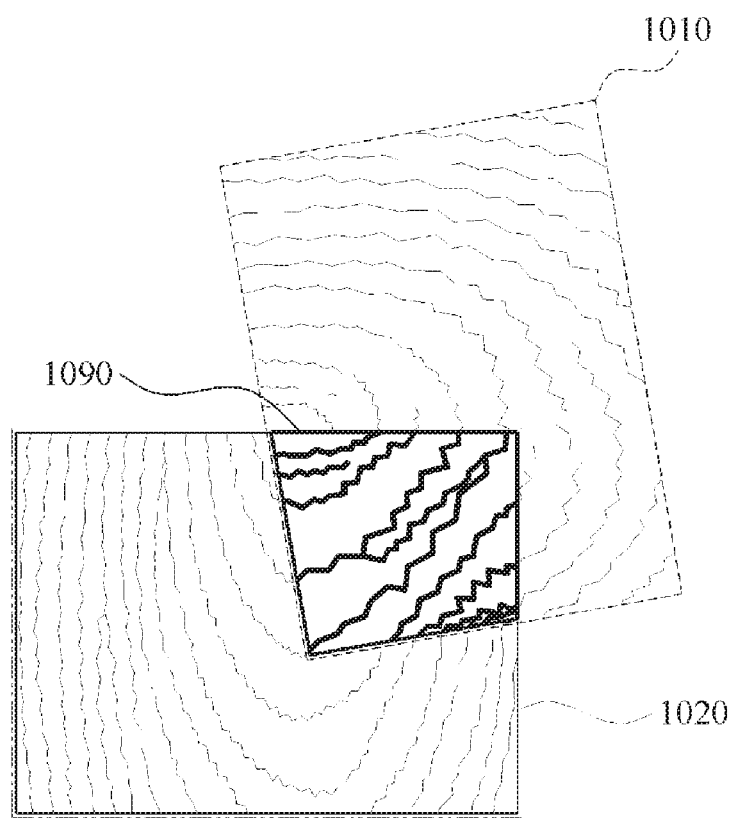
FIGS. 10 and 11 illustrate examples of a result obtained by matching an input modified image and an enrollment modified image according to at least one example embodiment.
Figure 11:
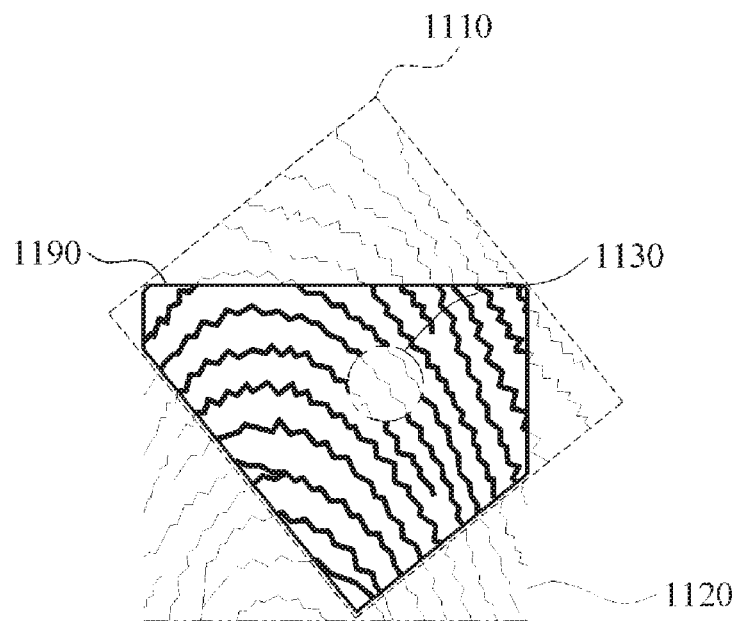

FIGS. 10 and 11 illustrate examples of a result obtained by matching an input modified image and an enrollment modified image according to at least one example embodiment.

Referring to FIG. 10, an input modified image 1010 may be matched to an enrollment modified image 1020. In an overlapping region 1090 of the input modified image 1010 and an enrollment modified image 1020, a portion in which fingerprints of the input modified image 1010 and an enrollment modified image 1020 match each other may be indicated by bold lines. In FIG. 10, a matching degree of the enrollment modified image 1020 and the input modified image 1010 may be relatively high and thus, an entire fingerprint of the overlapping region 1090 may be indicated by bold lines. Accordingly, each of the enrollment modified image 1020 and the input modified image 1010 may represent the same fingerprint.

Referring to FIG. 11, an enrollment modified image 1120 may be matched to an input modified image 1110. Similarly to FIG. 10, in an overlapping region 1190 of the input modified image 1110 and an enrollment modified image 1120, a portion in which fingerprints of the input modified image 1110 and an enrollment modified image 1120 match each other may also be indicated by bold lines. In contrast to the example of FIG. 10, a region 1130 may include a fingerprint having a non-matching portion as illustrated in FIG. 11. A remaining region other than the region 1130 may include a fingerprint of which an overall portion is a matching portion and thus, a relatively high similarity may be calculated in operation 910 of FIG. 9. To apply an example in which the overlapping region 1190 includes the region 1130 having the non-matching portion, a fingerprint recognition apparatus may determine histogram information by dividing an overlapping region into sub-regions as illustrated in FIG. 12.

Figure 12:
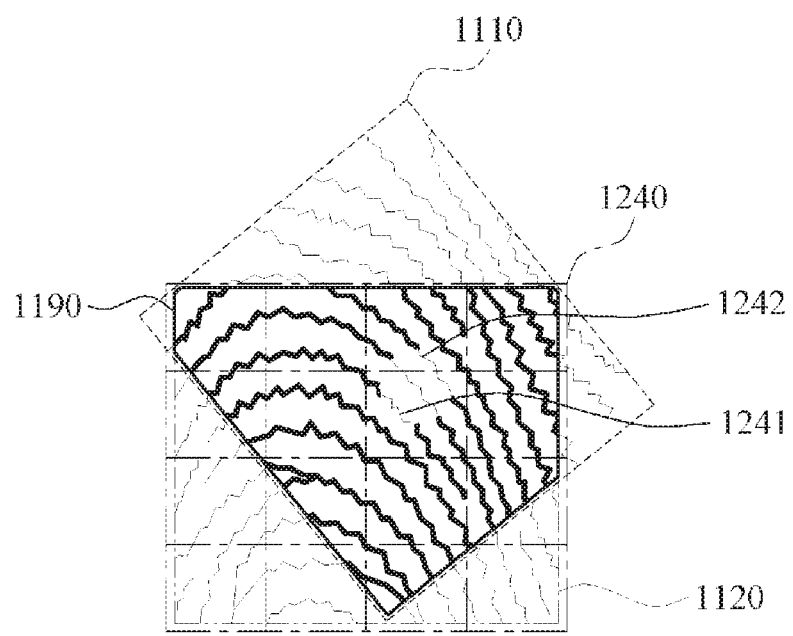
FIG. 12 illustrates an example of calculating a score by dividing an overlapping region according to at least one example embodiment.

FIG. 12 illustrates an example of calculating a score by dividing an overlapping region 1190 according to at least one example embodiment.

In an example, a processor (e.g., the processor 1310 discussed in greater detail below with reference to FIG. 13) may divide the overlapping region 1190 into sub-regions, and determine histogram information in the sub-regions based on an input modified image 1110 and an enrollment modified image 1120. Since the processor applies the histogram based on a unit of a sub-region, accuracy on fingerprint recognition may also be improved when a simple pattern of fingerprint appears in the overlapping regions 1190.

For example, as illustrated in FIG. 12, the processor may divide the overlapping region 1190 of the input modified image 1110 and the enrollment modified image 1120 into sub-regions as indicated by a grid pattern 1240. The processor may calculate a pixel difference between the input modified image 1110 and the enrollment modified image 1120 for each of the sub-regions. Through this, the processor may express values of the pixel difference of the sub-regions using a histogram, and determine information on the histogram as described with reference to operation 930 of FIG. 9.

FIG. 12 illustrates an example in which a similarity between two overlapping images is relatively high similarly to the aforementioned example of FIG. 11. In this example, each of the two overlapping images may include a different fingerprint. In FIG. 12 sub-blocks 1241 and 1242 are example of sub-regions. In FIG. 12, matching degrees of fingerprints may be relatively low in sub-blocks 1241 and 1242, and thus a relatively large pixel difference between the input modified image 1110 and the enrollment modified image 1120 may be calculated in the sub-blocks 1241 and 1242. The processor may divide the pixel differences in the sub-blocks of the input modified image 1110 and the enrollment modified image 1120 by a number of pixels included for each of the sub-blocks, normalize the divided pixel difference, and calculate a difference, for example, Hmax−min, between a maximum value and a minimum value of the normalized pixel difference for each of the sub-blocks. For example, the processor may calculate a plurality of difference values for a sub-region by performing a difference determination operation that includes calculating, for each one of a plurality of pixels of the enrollment modified image that are located in the sub-region, a difference between (i) a brightness value of the pixel of the enrollment modified image and (ii) a brightness value of a corresponding pixel in an input modified image, where pixels of the enrolment modified image correspond to pixels of the input modified image that are located in the same spatial location as the pixels of the enrolment modified image, respectively. Further, the processor may perform a difference value division operation for the sub-region that includes dividing each of the plurality of difference values calculated or the sub-region by the total number of pixels included in the sub region; and the processor may perform a normalization of the plurality of divided difference values. Further, the processor may perform a Hmax−min determination operation that includes determining, from among the plurality of normalized divided difference values of the sub region, a first difference value (e.g. the minimum difference value from among the plurality of normalized divided difference values calculated for the sub region) and a second difference value (e.g., the maximum difference value from among the plurality of normalized divided difference values calculated for the sub region), and calculating, as the Hmax−min of the sub-region, a difference between the determined first difference value and the determined second difference value. The processor may perform the above-referenced difference determination operation, difference value division operation, normalization, and Hmax−min determination operation for each sub-region.

When a value of Hmax−min is greater than a histogram threshold, the processor may determine that each of the input modified image 1110 and the enrollment modified image 1120 represents a different fingerprint despite the high similarity calculated in operation 910 of FIG. 9. Also, the processor may obtain a distribution value by expressing the normalized pixel difference values using a histogram so as to be used to improve accuracy on recognizing the input modified image 1110 and the enrollment modified image 1120.

FIG. 13 illustrates an example of a fingerprint recognition apparatus according to at least one example embodiment. According to at least one example embodiment, the fingerprint recognition apparatus 300 of FIG. 3 may have the structure illustrated in FIG. 13

A fingerprint recognition apparatus may include a processor 1310, a sensor 1320, and a memory 1330. The processor, 1310, the sensor 1320, and the memory 1330 may communicate with one another through a bus 1340.

The sensor 1320 may be, for example, the fingerprint sensor 310 of FIG. 3. The sensor 1320 may capture an image of a fingerprint based on a general scheme, for example, a scheme for converting an optical image to an electrical signal. The image may be output to the processor 1310. The sensor 1320 may be, for example, an optical sensor capable of capturing an image of a fingerprint or part of a fingerprint.

The processor 1310 may include at least one configuration described with reference to FIGS. 1 through 12. The processor 1310 may perform at least one method described with reference to FIGS. 1 through 12. Additionally, the processor 910 may be included in the fingerprint recognition apparatus 300 of FIG. 3. For example, according to at least some example embodiments, any or all operations described in the present disclosure as being performed by a processor may be performed and/or controlled by the processor 1310. According to at least some example embodiments, any or all operations described in the present disclosure as being performed by a fingerprint recognition apparatus (e.g., the fingerprint recognition apparatus 300) or an element thereof may be performed and/or controlled by the processor 1310. The term 'processor', as used herein, may refer to, for example, a hardware-implemented data processing device having circuitry that is physically structured to execute desired operations including, for example, operations represented as code and/or instructions included in a program. Examples of the above-referenced hardware-implemented data processing device include, but are not limited to, a microprocessor, a central processing unit (CPU), a processor core, a multi-core processor; a multiprocessor, an application-specific integrated circuit (ASIC), and a field programmable gate array (FPGA). Processors executing program code are programmed processors, and thus, are special-purpose computers.

The memory 1330 may store enrollment modified images enrolled through a modification after being captured by the sensor 1320, and enrollment property information corresponding to the enrollment modified images. Also, the memory 1330 may store, for example, the enrollment modified images, a matching result processed by the processor 1310, and/or a score, and a similarity calculated by the processor 1310. The memory 1330 may be, for example, a volatile memory and a non-volatile memory.

The memory 1330 may store the image database 320 and the property database 330 of FIG. 3. When the memory 1330 stores the property database 330, the processor 1310 may match images faster. Also, the memory 1330 may store enrollment modified images obtained by modifying an original image as the image database 320, thereby reducing an amount of the image database 320.

The processor 1310 may execute a program and control the fingerprint recognition apparatus. A program code executed by the processor 1310 may be stored in the memory 1330. The fingerprint recognition apparatus may be connected to an external device, for example, a personal computer (PC) and a network, through an input and output device to perform a data exchange. The term 'processor', as used in the present disclosure, may refer to, for example, a hardware-implemented data processing device having circuitry that is physically structured to execute desired operations including, for example, operations represented as code and/or instructions included in a program. Examples of the above-referenced hardware-implemented data processing device include, but are not limited to, a microprocessor, a central processing unit (CPU), a processor core, a multi-core processor; a multiprocessor, an application-specific integrated circuit (ASIC), and a field programmable gate array (FPGA). Processors executing program code are programmed processors, and thus, are special-purpose computers.

The fingerprint recognition apparatus may include (or, alternatively, be included in) various electronic devices including, for example, a mobile device such as a mobile phone, smartphone, a PC, a personal digital assistant (PDA), a laptop computer, and the like, a computing device such as a PC, a tablet computer, a netbook, and the like, and an electronic product such as a television (TV), a smart TV, a security device for controlling a gate, and the like.

Although the aforementioned descriptions are provided based on an example of recognizing a user based on a portion of a fingerprint of the user, one or more example embodiments may also be applied to an example of recognizing a user based on a partial item of biometric data of the user. Here, the biometric data may include, for example, fingerprint information, blood vessel information, and iris information of the user. In this example, the processor 1310 may receive input data corresponding to the partial item of the biometric data from the sensor 1320, modify the input data to be modified images, compare the modified images to enrollment modified data corresponding to partial data of pre-enrolled biometric data, and recognize the user based on a result of the comparing.

In an example, the sensor 1320 may include a sensor for recognizing a blood vessel pattern of the user. The sensor 1320 may extract the blood vessel pattern from a dorsum skin of a hand. The sensor 1320 may maximize a lightness contrast of a blood vessel to a skin using an infrared lighting and filter, and acquire an image including the blood vessel pattern. In this example, the sensor 1320 may acquire a modified image obtained by modifying the blood vessel. The processor 1310 may compare a modified image corresponding to a portion of the blood vessel to modified images of a pre-enrolled blood vessel patter, thereby recognizing the user.

In another example, the sensor 1320 may include a sensor for recognizing an iris pattern of a user. The sensor 1320 may scan or capture of the iris pattern between a pupil and a sclera, for example, a white area of an eye of the user. In this example, the processor 1310 may compare a modified image corresponding to a portion of the iris pattern to modified images of a pre-enrolled iris pattern, thereby recognizing the user.

The units and/or modules described herein may be implemented using hardware components and software components. For example, the hardware components may include microphones, amplifiers, band-pass filters, audio to digital converters, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. A fingerprint recognition method comprising:
generating an enrollment modified image by modifying a fingerprint image corresponding to a fingerprint to be enrolled;
extracting enrollment property information from the fingerprint image;
generating mapping information that maps the enrollment modified image to the enrollment property information;
storing the enrollment modified image and the enrollment property information;
matching an input modified image and the enrollment modified image;
dividing an overlapping region of the input modified image and the enrollment modified image into sub-regions;
calculating, for each of the sub-regions, histogram information of the input modified image relative to the enrollment modified image; and
determining a score corresponding to the matching based on the histogram information,
the modifying of the fingerprint image including converting a type of the fingerprint image to a modified type, the modified type being a local binary pattern (LBP) type, a histogram of oriented gradients (HOG) type, a Haar feature type, a modified census transform (MCT) type, or a geometrically warped type.

2. The method of claim 1, wherein the modifying includes modifying the fingerprint image in at least one of a spatial domain and a frequency domain.

3. The method of claim 1, wherein the extracting includes extracting enrollment phase information from the fingerprint image based on a frequency-domain transform scheme.

4. The method of claim 1,
wherein the matching the input modified image and the enrollment modified image comprises:
receiving an input fingerprint image;
extracting first property information from a query fingerprint included in the input fingerprint image;
generating the input modified image by modifying the input fingerprint image; and
matching the input modified image and the enrollment modified image based on the extracted first property information and the enrollment property information; and
wherein the determining comprises:
recognizing the query fingerprint based on a result of the matching.

5. The method of claim 4, wherein the determining includes determining the score indicating a degree to which the input modified image matches the enrollment modified image in the overlapping region of the input modified image and the enrollment modified image.

6. The method of claim 5, wherein the determining includes determining the score further based on at least one of
a similarity between the input modified image and the enrollment modified image, and
information associated with the input fingerprint image.

7. The method of claim 4, wherein the matching includes determining at least one of translation information, rotation information, and scale information of the input modified image and the enrollment modified image, based on the first property information and the enrollment property information.

8. The method of claim 4,
wherein the extracting includes extracting phase information from the query fingerprint based on a frequency-domain transform scheme, and
wherein the matching includes matching the input modified image and the enrollment modified image based on a phase of correlation (POC) between the phase information and enrollment phase information associated with the enrollment fingerprint.

9. A non-transitory computer-readable medium comprising program code that, when executed by a processor, performs functions according to the method of claim 1.

10. A fingerprint recognition apparatus comprising:
a sensor configured to receive a fingerprint image corresponding to a fingerprint to be enrolled;
a processor configured to generate an enrollment modified image by modifying the fingerprint image and extract enrollment property information from the fingerprint image; and
a memory configured to store the enrollment modified image and the enrollment property information such that the enrollment modified image and the enrollment property information are mapped,
wherein the processor is further configured such that the modifying includes converting a type of the fingerprint image to a modified type, the modified type being a local binary pattern (LBP) type, a histogram of oriented gradients (HOG) type, a Haar feature type,
wherein the processor is further configured to
match an input modified image and the enrollment modified image,
divide an overlapping region of the input modified image and the enrollment modified image into sub-regions,
calculate, for each of the sub-regions, histogram information of the input modified image relative to the enrollment modified image, and
determine a score corresponding to the matching based on the histogram information.

11. The apparatus of claim 10, wherein the processor is configured to generate the enrollment modified image by performing modification in at least one of a spatial domain and a frequency domain.

12. The apparatus of claim 10, wherein the processor is configured to extract enrollment phase information from the fingerprint image based on a frequency-domain transform scheme.

13. The apparatus of claim 10,
wherein the sensor is configured to receive an input fingerprint image, and
wherein the processor is configured to
extract first property information from a query fingerprint appearing in the input fingerprint image,
generate the input modified image by modifying the input fingerprint image,
match the input modified image and the enrollment modified image based on the extracted first property information and the enrollment property information, and
recognize the query fingerprint based on a result of the matching.

14. The apparatus of claim 13, wherein the processor is configured to determine the score indicating a degree to which the input modified image matches the enrollment modified image in the overlapping region of the input modified image and the enrollment modified image.

15. The apparatus of claim 14, wherein the processor is configured to determine a similarity in the overlapping region between the input modified image and the enrollment modified image.

16. The apparatus of claim 14, wherein the processor is configured to determine the score further based on at least one of a similarity between the input modified image and the enrollment modified image, and information associated with the input fingerprint image.

17. The apparatus of claim 13, wherein the processor is configured to determine at least one of translation information, rotation information, and scale information of the input modified image and the enrollment modified image, based on the first property information and the enrollment property information.

18. The apparatus of claim 13, wherein the processor is configured to extract phase information from the query fingerprint based on a frequency-domain transform scheme, and match the input modified image and the enrollment modified image based on a phase of correlation (POC) between the phase information and enrollment phase information associated with the enrollment fingerprint.

* * * * *